United States Patent
Wirola et al.

(10) Patent No.: US 9,612,313 B2
(45) Date of Patent: Apr. 4, 2017

(54) SUPPORTING COVERAGE AREA MODELING

(71) Applicant: HERE Global B.V., Veldhoven (NL)

(72) Inventors: Lauri Aarne Johannes Wirola, Tampere (FI); Laura Wirola, Tampere (FI); Jari Tapani Syrjärinne, Tampere (FI); Matti Samuli Raitoharju, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 165 days.

(21) Appl. No.: 14/185,652

(22) Filed: Feb. 20, 2014

(65) Prior Publication Data
US 2014/0243012 A1    Aug. 28, 2014

(51) Int. Cl.
*H04W 24/00* (2009.01)
*G01S 5/02* (2010.01)
(Continued)

(52) U.S. Cl.
CPC .......... *G01S 5/0263* (2013.01); *G01S 5/0236* (2013.01); *G01S 5/0252* (2013.01); *H04W 16/18* (2013.01); *H04W 24/10* (2013.01); *H04W 64/00* (2013.01)

(58) Field of Classification Search
CPC .... G01S 5/0236; G01S 5/0252; G01S 5/0263; H04W 16/18; H04W 24/10; H04W 64/00
(Continued)

(56) References Cited

U.S. PATENT DOCUMENTS

| | | | | |
|---|---|---|---|---|
| 5,960,341 A | * | 9/1999 | LeBlanc | G01S 1/045 340/995.1 |
| 6,219,550 B1 | * | 4/2001 | Kanerva | H04W 36/26 455/226.1 |

(Continued)

FOREIGN PATENT DOCUMENTS

| WO | 2013/136123 A1 | 9/2013 |
|---|---|---|
| WO | 2013/136124 A1 | 9/2013 |
| WO | 2013/136128 A1 | 9/2013 |

OTHER PUBLICATIONS

International Search Report and Written Opinion received for corresponding Patent Cooperation Treaty Application No. PCT/IB2013/051513, dated Jul. 10, 2013, 8 pages.

*Primary Examiner* — Babar Sarwar
(74) *Attorney, Agent, or Firm* — Alston & Bird LLP

(57) ABSTRACT

A system obtains information on positions stored for a communication node and criteria that are met by the node. The system selects a-priori information on a coverage area size that is stored for nodes meeting the criteria. Different a-priori information is stored for nodes meeting different criteria. The system estimates a value of at least one parameter representing a coverage area of the node based on the information on the positions and the selected a-priori information. The value of the at least one parameter is stored. For generating the a-priori information, the system may extract from a memory information indicating a size of a coverage area for each of a plurality of communication nodes, compute a statistical value based on information indicating a size of a coverage area that is extracted for a plurality of nodes meeting the same criteria, and provide the computed statistical value as a-priori information.

17 Claims, 9 Drawing Sheets

(51) Int. Cl.
*H04W 16/18* (2009.01)
*H04W 24/10* (2009.01)
*H04W 64/00* (2009.01)

(58) Field of Classification Search
USPC ............ 455/404.2, 412.1–414.2, 418–422.1, 455/435.1–444, 456.1, 456.3, 457; 370/328–332, 338
See application file for complete search history.

(56) References Cited

U.S. PATENT DOCUMENTS

| | | | | |
|---|---|---|---|---|
| 6,424,638 | B1* | 7/2002 | Ray | H04W 36/0066 370/331 |
| 6,564,065 | B1* | 5/2003 | Chang | H04W 64/00 342/357.29 |
| 8,644,841 | B1* | 2/2014 | Oroskar | H04W 28/08 455/442 |
| 2005/0071476 | A1* | 3/2005 | Tejaswini | H04W 8/22 709/227 |
| 2005/0176419 | A1* | 8/2005 | Triolo | H04W 52/343 455/423 |
| 2005/0250496 | A1* | 11/2005 | Hason | G01S 5/0257 455/436 |
| 2006/0129317 | A1* | 6/2006 | Farmer | G01S 19/06 701/469 |
| 2006/0220954 | A1* | 10/2006 | Hunt | G01S 19/48 342/357.31 |
| 2006/0240840 | A1* | 10/2006 | Morgan | G01S 5/02 455/456.1 |
| 2008/0004037 | A1* | 1/2008 | Achlioptas | G01S 5/0236 455/456.1 |
| 2008/0214184 | A1* | 9/2008 | Carlson | G01S 5/021 455/424 |
| 2009/0011773 | A1* | 1/2009 | Balachandran | H04W 84/12 455/456.1 |
| 2009/0264136 | A1* | 10/2009 | Ische | G01S 5/02 455/456.1 |
| 2010/0039929 | A1* | 2/2010 | Cho | G01S 5/0252 370/216 |
| 2010/0278100 | A1* | 11/2010 | West | H04W 52/241 370/328 |
| 2011/0117930 | A1* | 5/2011 | Zhang | H04B 17/26 455/456.1 |
| 2012/0050098 | A1* | 3/2012 | Kuehnel | G01S 5/0242 342/357.31 |
| 2015/0100743 | A1* | 4/2015 | Wirola | G01S 5/0252 711/154 |

* cited by examiner

SUPPORTING COVERAGE AREA MODELING

FIELD OF THE DISCLOSURE

The invention relates to supporting coverage area modeling and in particular to supporting the generation of coverage area estimates for communication nodes that may be used for positioning purposes.

BACKGROUND

Modern global cellular and non-cellular positioning technologies are based on generating large global databases containing information on cellular and non-cellular signals. The information may originate entirely or partially from users of these positioning technologies. This approach is also referred to as "crowd-sourcing".

The information provided by users is typically in the form of "fingerprints", which contain a location that is estimated based on, e.g., received satellite signals of a global navigation satellite system (GNSS) and measurements taken from one or more radio interfaces for signals of a cellular and/or non-cellular terrestrial system. In the case of measurements on cellular signals, the results of the measurements may contain a global and/or local identification of the cellular network cells observed, their signal strengths and/or pathlosses and/or timing measurements like timing advance (TA) or round-trip time. For measurements on wireless local area network (WLAN) signals, as an example of signals of a non-cellular system, the results of the measurements may contain a basic service set identification (BSSID), like the medium access control (MAC) address of observed access points (APs), the service set identifier (SSID) of the access points, and the signal strength of received signals (received signal strength indication RSSI or physical Rx level in dBm with a reference value of 1 mW, etc.).

This data may then be transferred to a server or cloud, where the data may be collected and where further models may be generated based on the data for positioning purposes. Such further models can be coverage area estimates, communication node positions and/or radio channel models, with base stations of cellular communication networks and access points of WLANs being exemplary communication nodes. In the end, these refined models may be used for estimating the position of mobile terminals.

Fingerprints do not necessarily have to comprise a GNSS based position. They could also include cellular and/or WLAN measurements only. In this case the fingerprint could be assigned a position for example based on a WLAN based positioning in a server. Such self-positioned fingerprints can be used to learn cellular network information, in case there are cellular measurements in the fingerprint. Moreover, in a set of WLAN measurements in a fingerprint there may be, in addition to measurements for known WLAN access points, also measurements for unknown access points, and the position of the unknown access points can be learned through these self-positioned fingerprints. Finally, more data can be learned for previously known access points based on self-positioned fingerprints.

It may be noted that even when using a mobile terminal having GNSS-capabilities, a user may benefit from using cellular/non-cellular positioning technologies in terms of time-to-first-fix and power consumption. Also, not all applications require a GNSS-based position. Furthermore, cellular/non-cellular positioning technologies work indoors as well, which is generally a challenging environment for GNSS-based technologies.

SUMMARY OF SOME EMBODIMENTS OF THE INVENTION

For a first aspect, a method is described which comprises, performed by at least one apparatus, obtaining information on at least one position stored for a communication node and at least one criterion that is met by the communication node, selecting a-priori information on a coverage area size that is stored for communication nodes meeting the at least one criterion, wherein different a-priori information is stored for communication nodes meeting different criteria, estimating a value of at least one parameter representing a coverage area of the communication node based on the obtained information on the at least one position and the selected a-priori information, and causing a storage of the value of the at least one parameter representing the coverage area of the communication node.

For a second aspect, a method is described which comprises, performed by at least one apparatus, extracting from a memory information indicating a size of a coverage area for each of a plurality of communication nodes, computing a statistical value based on information indicating a size of a coverage area that is extracted for a plurality of communication nodes meeting a same at least one criterion, and providing the computed statistical value as a-priori information for an estimation of a value of at least one parameter representing a coverage area of a communication node meeting the at least one criterion.

Moreover a first system is described, which comprises means for realizing the actions of the method presented for the first aspect and/or the actions of the method presented for the second aspect.

The means of the system can be implemented in hardware and/or software. They may comprise for instance at least one processor for executing computer program code for realizing the required functions, at least one memory storing the program code, or both. Alternatively, they could comprise for instance circuitry that is designed to realize the required functions, for instance implemented in a chipset or a chip, like an integrated circuit. In general, the means may comprise for instance one or more processing means.

Moreover a second system is described, which comprises at least one processor and at least one memory including computer program code, the at least one memory and the computer program code configured to, with the at least one processor, cause at least one apparatus at least to perform the actions of the method presented for the first aspect and/or the actions of the method presented for the second aspect.

Any of the described systems may be an apparatus or comprise a plurality of apparatuses. In the latter case, the means of the presented first system could be distributed for instance to a plurality of apparatuses. Similarly, the at least one processor and the at least one memory of the presented second system could be distributed for instance to a plurality of apparatuses. Any mentioned apparatus may be a module or a component for a device, for example a chip. Alternatively, any of the mentioned apparatuses may be a device, for instance a server.

Any of the described systems may further comprise only the indicated components or one or more additional components. For example, any of the systems may optionally comprise in addition a database storing parameters representing coverage areas of communication nodes and/or a mobile terminal, etc.

In certain embodiments, the described methods are information providing methods, and the described systems are or comprise information providing apparatuses.

In certain embodiments of the described methods, the methods are methods for supporting coverage area modeling. In certain embodiments of the described systems, the systems are systems for supporting coverage area modeling.

Moreover a non-transitory computer readable storage medium is described, in which computer program code is stored. The computer program code causes at least one apparatus to perform the actions of the method presented for the first aspect and/or the actions of the method presented for the second aspect when executed by at least one processor.

The computer readable storage medium could be for example a disk or a memory or the like. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

It is to be understood also the respective computer program code by itself has to be considered an embodiment of the invention. The computer program code could also be distributed to several computer readable storage mediums.

It is to be understood that the presentation of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

Figure 1:
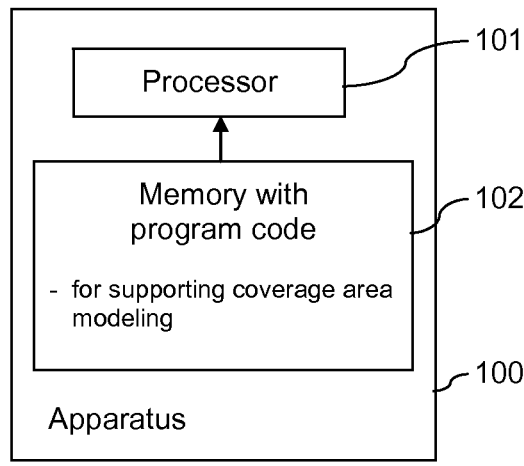
FIG. 1 is a schematic block diagram of an exemplary embodiment of a system.

FIG. 1 is a schematic block diagram of an exemplary embodiment of a system in the form of an exemplary apparatus 100. This embodiment relates to the first aspect of the invention. Apparatus 100 comprises a processor 101 and, linked to processor 101, a memory 102. Memory 102 stores computer program code for supporting coverage area modeling. Processor 101 is configured to execute computer program code stored in memory 102 in order to cause an apparatus to perform desired actions.

Apparatus 100 could be a server or any other device. Apparatus 100 could equally be a module, like a chip, circuitry on a chip or a plug-in board, for a server or for any other device. Optionally, apparatus 100 could comprise various other components, like a data interface, a user interface, a further memory, a further processor, etc.

An operation of apparatus 100 will now be described with reference to the flow chart of FIG. 2. The operation is an exemplary embodiment of a method according to the first aspect of the invention. Processor 101 and the program code stored in memory 102 cause an apparatus to perform the operation when the program code is retrieved from memory 102 and executed by processor 101. The apparatus that is caused to perform the operation can be apparatus 100 or some other apparatus, for example but not necessarily a device comprising apparatus 100.

The apparatus obtains information on at least one position stored for a communication node and at least one criterion that is met by the communication node. (action 111) The at least one position could be for example at least one position at which the communication node has been observed by a mobile device. The information can be, for instance, received from a mobile device, retrieved from a memory, received from another apparatus collecting such information or be obtained in any other suitable manner. The communication node can be any type of cellular or non-cellular communication node.

The apparatus moreover selects a-priori information on a coverage area size that is stored for communication nodes meeting the at least one criterion, wherein different a-priori information is stored for communication nodes meeting different criteria. (action 112)

The apparatus moreover estimates a value of at least one parameter representing a coverage area of the communication node based on the obtained information on the at least one position and the selected a-priori information. (action 113)

The apparatus moreover causes a storage of the value of the at least one parameter representing the coverage area of the communication node. (action 114) The value of the at least one parameter can be stored in a storage medium that is internal or external to the apparatus.

Figure 3:
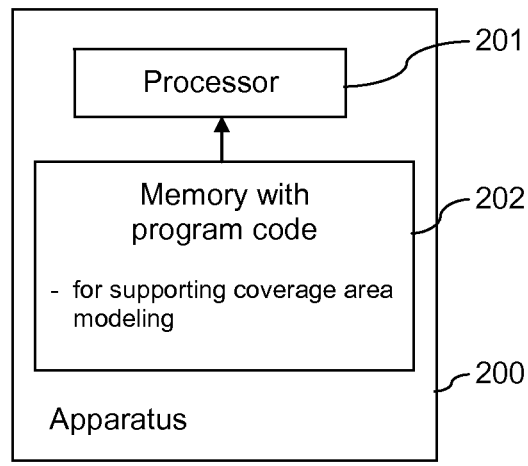
FIG. 3 is a schematic block diagram of a further exemplary embodiment of a system.

FIG. 3 is a schematic block diagram of another exemplary embodiment of a system in the form of an exemplary apparatus 200. This embodiment relates to the second aspect of the invention. Apparatus 200 comprises a processor 201 and, linked to processor 201, a memory 202. Memory 202 stores computer program code for supporting coverage area modeling. Processor 201 is configured to execute computer program code stored in memory 202 in order to cause an apparatus to perform desired actions.

Apparatus 200 could be a server or any other device. Apparatus 200 could equally be a module, like a chip, circuitry on a chip or a plug-in board, for a server or for any other device. Optionally, apparatus 200 could comprise various other components, like a data interface, a user interface, a further memory, a further processor, etc.

An operation of apparatus 200 will now be described with reference to the flow chart of FIG. 4. The operation is an exemplary embodiment of a method according to the second aspect of the invention. Processor 201 and the program code stored in memory 202 cause an apparatus to perform the operation when the program code is retrieved from memory 202 and executed by processor 201. The apparatus that is caused to perform the operation can be apparatus 200 or some other apparatus, for example but not necessarily a device comprising apparatus 200.

The apparatus extracts from a memory information indicating a size of a coverage area for each of a plurality of communication nodes. (action 211) The information can indicate the size directly or indirectly. For example, it could be a radius or diameter value. But it could equally be a description of an area, which allows computing a radius of a corresponding circular area, etc.

The apparatus moreover computes a statistical value based on information indicating a size of a coverage area that is extracted for a plurality of communication nodes meeting a same at least one criterion. (action 212)

The apparatus provides the computed statistical value as a-priori information for an estimation of a value of at least one parameter representing a coverage area of a communication node meeting the at least one criterion. (action 213)

Optionally but not necessarily, apparatus 100 and apparatus 200 could belong to a single system. In this case, they could both be integrated in separate devices that may communicate with each other, or they could be integrated in a single device, or they could be implemented as a single apparatus with one or more processors and with one or more memories storing the program code of memory 102 and memory 202.

The invention proceeds from the consideration that in crowd-sourced learning and positioning systems, there may always be communication nodes, for which only a single or a few samples have been received so far. When using information on such communication nodes as a basis for positioning computations, the positioning quality, in terms of accuracy and consistency, may not be at an acceptable level. The term sample refers to fingerprint data for a particular communication node including at least an identification of the node and an indication of a position. In the case of a new node, for which only a single sample has been received, a coverage area cannot be estimated based on the information from the sample only—the area would have to be a point. When there are just a few samples, the coverage area size that is determined using the information from the samples only cannot be trusted yet.

Figures 5A, 5B:
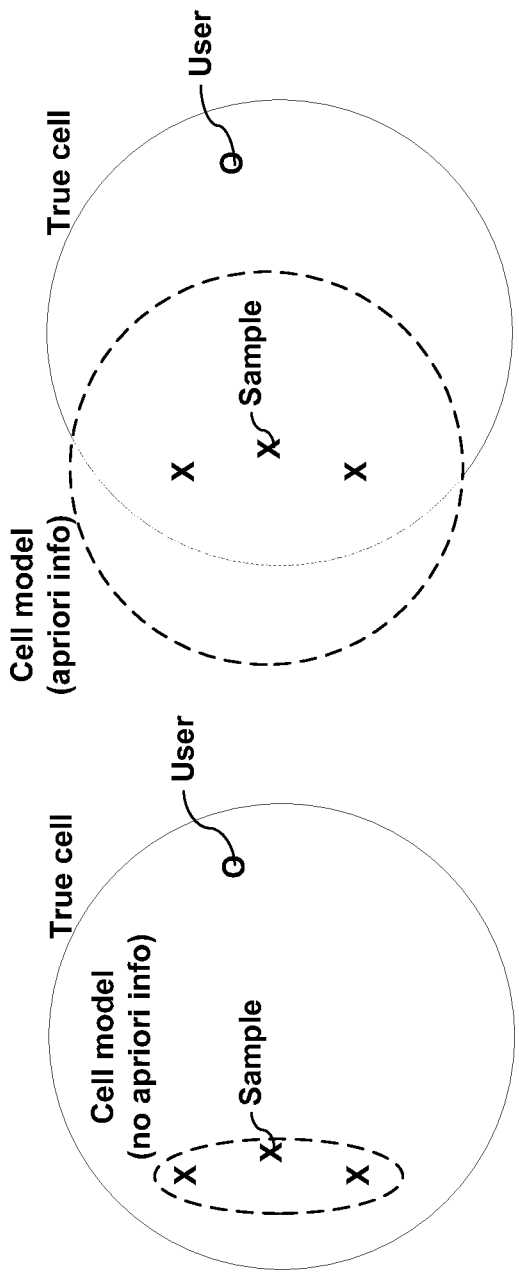
FIGS. 5a and 5b are diagrams illustrating an exemplary effect of the use of a-priori information in coverage area modeling.

The latter situation is illustrated in FIG. 5a. Here, an exemplary "true cell" is depicted, which may correspond in real-life to a circular coverage area of a cellular communication node having 4 km in diameter. So far, three samples have been received for the node and stored in a database. The positions indicated in the samples are marked as "X". Based on these positions, a coverage area could be estimated and the resulting coverage area model could be the ellipse that is drawn with a dashed line in FIG. 5a. Now, a user and a user device may be located at location marked as "O", and the user may wish to obtain a position estimate for the device. The position may then be estimated based on the estimated coverage area. However, the user experience will be fairly bad, because the device will be positioned quite far to the East from its true position. Moreover, because the uncertainty estimate that is reported to a user is generally related to the size of the estimated coverage area, the uncertainty may be incorrectly reported to be quite small.

Certain embodiments of the first aspect of the invention therefore provide that a-priori information is used for estimating the size of a coverage area of communication node. Different stored a-priori information can be associated with different criteria. When the size of a coverage area of a communication node is to be estimated, the a-priori information is selected that is associated with a criterion met by the node. A value of at least one parameter representing the coverage area of the communication node may then be stored, for instance for use in positioning computations.

Certain embodiments of the second aspect of the invention provide that a-priori information on a size of a coverage area may be generated based on available information on the size of coverage areas for a plurality of communication nodes. A-priori information may be obtained by combining available information for selected nodes in a statistical manner. The nodes are selected such that they meet the same criterion or the same set of criteria. Other a-priori information may be obtained by combining available information for nodes that meet some other criterion or some other set of criteria in a statistical manner.

Certain embodiments of the invention may thus allow obtaining a useful coverage area estimate even for those communication nodes, for which only one or a few samples have been received so far.

A possible and exemplary effect of using a-priori information about the size of a coverage area is illustrated in FIG. 5b. The situation depicted in FIG. 5b is similar to the situation depicted in FIG. 5a, but in this case the learning system may know that a typical diameter of a cell, as an exemplary coverage area, is 4 km. In the learning process, a system can combine this a-priori information with the information on positions "X" from available samples. A possible resulting coverage area model is shown with a dashed line. Now, when a user and a user device are located at location "O", the user wishes to know the position of the device and the position is determined based on the estimated coverage area, the resulting position will still be East from the true position as before. However, this time an uncertainty reported to the user may be much bigger, because the estimated size of the coverage area used in the positioning is larger. This may improve the user experience. Moreover, in case coverage area models for multiple nodes are available for positioning, the position estimate could be a linear combination of coverage area estimates, in which the weight of each coverage area estimate is inversely proportional to the coverage area size. Thus the larger a coverage area is, the less impact it has on the position estimate. Using larger coverage area models also for communication nodes, for which only few samples are available, may therefore have the effect of improving the accuracy of the position estimate. On the other hand, assuming generally a particularly large size for the coverage areas may increase the uncertainty of a position estimate unnecessarily. Associating a-priori information on the size of the coverage area of communication nodes with criteria that have to be met by the communication nodes may have the effect that a particularly suitable size of a coverage area can be determined for any communication node.

Figure 2:
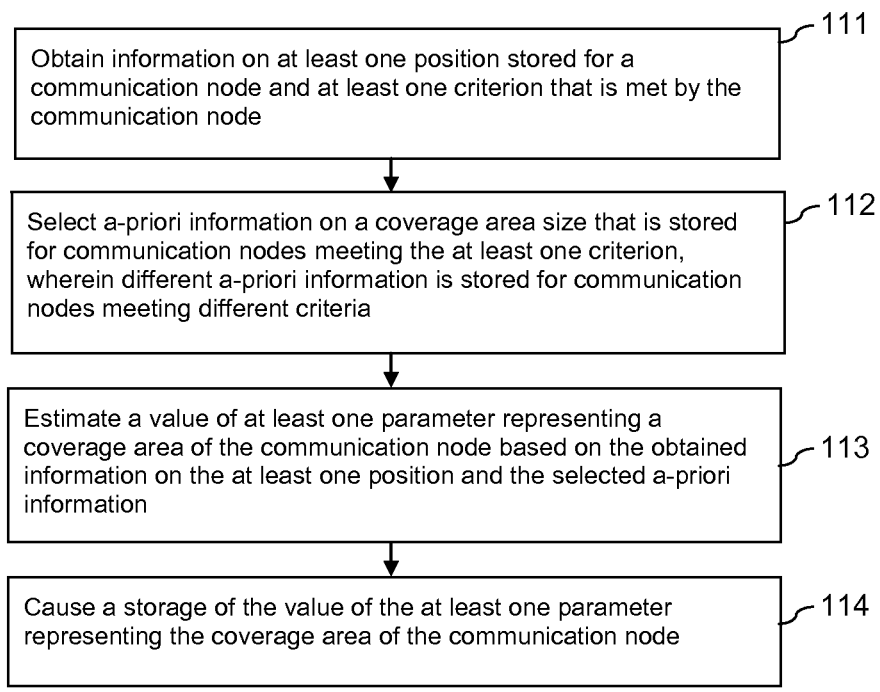
FIG. 2 is a flow chart illustrating an exemplary embodiment of a method.
Figure 4:
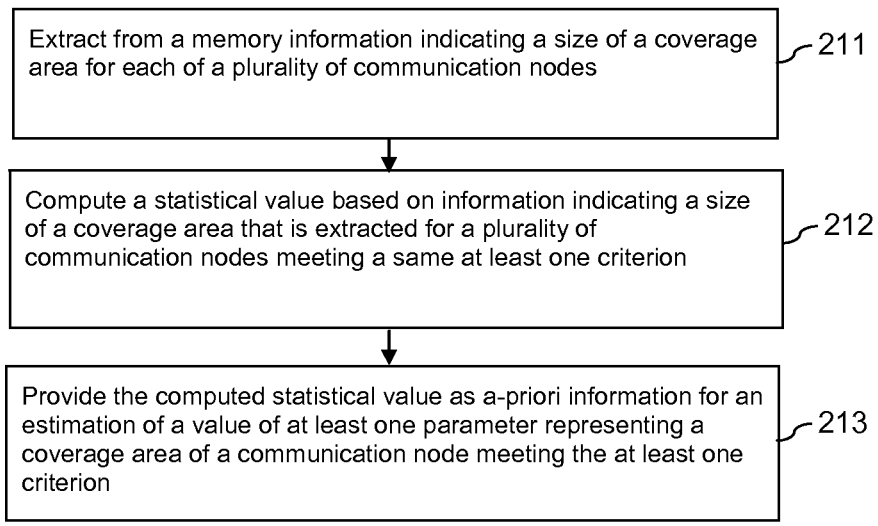
FIG. 4 is a flow chart illustrating a further exemplary embodiment of a method.

Apparatus 100 illustrated in FIG. 1 and the method illustrated in FIG. 2 as well as apparatus 200 illustrated in FIG. 3 and the method illustrated in FIG. 4 may be implemented and refined in various ways.

In an exemplary embodiment of the first aspect, the at least one criterion relates to a type of air interface supported by the communication node. A supported type of air interface could be for example a WLAN interface, a global system for mobile communications (GSM) enhanced data rates for GSM Evolution (EDGE) radio access network (GERAN) interface, a universal mobile telecommunications system (UMTS) terrestrial radio access (UTRAN) interface, a frequency division duplexing (FDD) or a time division duplexing (TDD) interface, an evolved UTRAN (E-UTRAN) interface, a code division multiple access (CDMA) interface, a worldwide interoperability for microwave access (WiMAX) interface, a Bluetooth (BT) interface or a Bluetooth low energy (BT LE) interface. For example, GERAN cells are typically larger than UTRA cells, and WLAN access points have typically a much smaller coverage area than nodes of a cellular communication system.

Alternatively or in addition, the at least one criterion relates a frequency range supported by the communication node. This allows taking into account that the radio propagation is a function of the employed frequency. With the same type of technology, the coverage area of nodes using a lower frequency band is larger than the coverage area of nodes using a higher frequency band.

Alternatively or in addition, the at least one criterion relates to a network operator operating the communication node, if applicable. This allows taking into account that different operators design their networks differently.

Alternatively or in addition, the at least one criterion relates to a geographical area in which the communication node is located. This allows differentiating for example between nodes in urban, sub-urban and rural environments. In urban environments, the coverage areas tend to be smaller than in sub-urban or rural environments because of higher capacity requirements.

Alternatively or in addition, the at least one criterion relates to a time-of-day at which the communication node is currently operating. This allows taking into account cell loading effects. For example, Wide-band CDMA (WCDMA) cells are typically larger during quiet times, like night times, than during more busy times. Alternatively or in addition, the at least one criterion relates to a time-of-year at which the communication node is currently operating. This allows taking into account seasonal effects. For example, trees having leaves may have a different impact on the size of the coverage area of a node than trees not having leaves. For the use of time dependent criteria, information on multiple coverage areas may be stored for a given communication node.

The kind and number of used types of criteria can thus be selected arbitrarily. In an exemplary embodiment, the at least one criterion could be a single criterion requiring a particular technology, like WLAN, GSM or WCDMA. In another exemplary embodiment, the at least one criterion could be two criteria, one for a particular technology and another one for a particular frequency band. This allows further differentiating between nodes of the same technology. For example, for WLAN, there could be different a-priori values for 2.4 GHz and 5.0 GHz bands, and for GERAN, there could be different a-priori values for 900 MHz and 1800 MHz bands, and so on.

In an exemplary embodiment of the first aspect, estimating the value of the at least one parameter representing a coverage area of the communication node based on the obtained information about the at least one position and the selected a-priori information comprises estimating a value of the at least one parameter based on the information about the at least one position and adjusting the value of the at least one parameter using the a-priori information.

In an exemplary embodiment of the first aspect, the influence of the a-priori information in estimating the value of the at least one parameter representing a coverage area of the communication node based on the obtained information on the at least one position and the selected a-priori information is the lower, the higher the number of the at least one position on which information is obtained. This allows taking account of the fact that with an increasing number of positions, the estimate of a coverage area that can be deduced from the positions only gets more accurate.

In a variation of this embodiment, the influence of the a-priori information may be the lower, the higher the number of samples including an indication of a position that have been received for the communication node. The number of positions on which information is obtained for estimating at least one parameter representing a coverage area of a communication node and the number of samples including an indication of a position that have been received for the communication node may, but do not have to be the same. If the received samples are stored in the form of a grid, for instance, the position that is indicated in a received sample may be mapped to a respective grid point. If a plurality of positions has been mapped to the same grid point, a corresponding position may, in certain embodiments, be considered only once when estimating at least one parameter representing a coverage area. In particular with small coverage areas, the number of positions that are considered for estimating at least one parameter representing the coverage area may stay rather small in this case, even when the number of received samples including an indication of a position constantly rises. This may be taken into account by using the number of received samples including an indication of a position as an additional or alternative criterion for adjusting the influence of the a-priori information.

In a further variation of the embodiment, the influence of the a-priori information may be the lower, the higher the dynamics of received signal strength levels that are indicated in stored information for the communication node. For certain embodiments, it may be assumed that received samples with varying indicated received signal strength levels, e.g. varying Rx levels values, can be considered to have a good spatial extent even in case there is only a small number of positions for which information is obtained. Therefore, the dynamics of received signal strength levels, which may be indicated in certain embodiments in received samples for a communication node, may be used as an additional or alternative criterion for adjusting the influence of the a-priori information.

An exemplary embodiment of the first aspect comprises, as preceding actions, extracting from a memory information indicating a size of a coverage area for each of a plurality of communication nodes and computing as a respective a-priori information a statistical value based on the information extracted for a plurality of communication nodes meeting a same at least one criterion. This may allow obtaining the a-priori information based on real-world data. The at least one criterion may be again, for example, any one or more of the criteria presented above.

In an exemplary embodiment of the first aspect, information indicating a size of a coverage area that is stored in the memory for a respective communication node is only considered for computing a-priori information if the information indicating a size of a coverage area is based on a predetermined number of positions for the communication node and/or if more than a predetermined number of samples including an indication of a position have been received for the communication node and/or if stored information for the communication node comprises indications of received signal strength levels with predetermined dynamics. This may have the effect that only information on a size for a coverage area for those nodes is considered that may be expected to be fairly accurate. While a large number of positions may generally indicate that the information indicating a size of a coverage area of a node should be fairly accurate, sometimes the information indicating a size of a coverage area of a node having a small coverage area may be very accurate even if it is based on a small number of positions. To take account of such situations, the number of samples including an indication of a position that have been received for the communication node and/or the dynamics of received signal strength levels that may be received in an exemplary embodiment in samples for a communication node may be used as an additional or alternative criterion to the number of positions on which the information indicating a size of a coverage area is based.

In an exemplary embodiment of the first aspect, the extracted information indicating a size of a coverage area for a respective communication node defines an ellipse. Computing a respective a-priori information may then comprise computing for each of the plurality of communication nodes meeting the same at least one criterion a radius of a circular model based on the extracted information defining an ellipse and statistically combining the radii that have been determined for the plurality of communication nodes meeting the same at least one criterion. The extracted information defining an ellipse could comprise for instance a value of a semi-major axis and a value of a semi-minor axis of the ellipse, or elements of a covariance matrix representing the ellipse. Using a circular model as a basis for the a-priori information may have the effect that any directional aspects of individual coverage areas may have no influence on the a-priori information.

It is to be understood that certain embodiments of a system according to the first aspect may comprise a plurality of apparatuses and that the presented functions may also be implemented in a distributed manner to these apparatuses in the system.

It is further to be understood that any detail presented for any exemplary embodiment of the first aspect can also be used by itself or in any combination with other details in exemplary embodiments of the second aspect.

Figure 6:
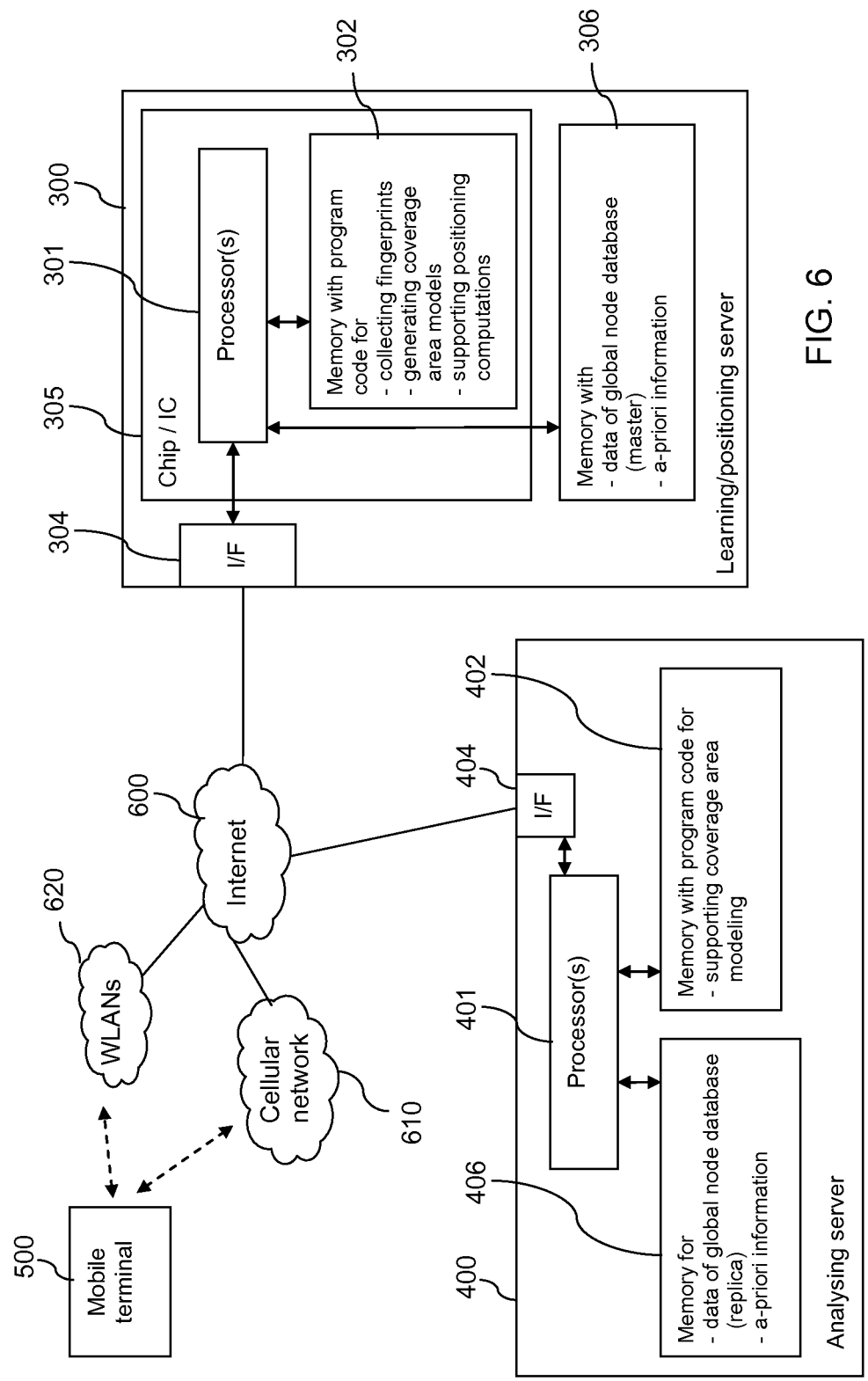
FIG. 6 is a schematic block diagram of another exemplary embodiment of a system.

FIG. 6 is a schematic block diagram of an exemplary embodiment of a system according to both aspects of the invention. The system supports coverage area modeling.

The system comprises a first server 300, a second server 400 and a mobile terminal 500. The system further comprises a network 600, for example the Internet. Servers 300 and 400 could also belong to network 600. The system further comprises at least one cellular network 610 and at least one WLAN 620, which are connected to network 600.

Server 300 may be for instance a dedicated learning/positioning server, or some other kind of server. It comprises a processor 301 that is linked to a first memory 302, to a second memory 306 and to an interface (I/F) 304. Processor 301 is configured to execute computer program code, including computer program code stored in memory 302, in order to cause server 300 to perform desired actions.

Memory 302 stores computer program code for generating coverage area model parameters and thus for supporting coverage area modeling. The computer program code may comprise for example similar program code as memory 102. In addition, memory 302 may store computer program code implemented to realize other functions, like collecting, processing and storing fingerprint data, generating and storing radio channel models and carrying out positioning computations. In addition, memory 302 could also store other kind of data.

Processor 301 and memory 302 may optionally belong to a chip or an integrated circuit 305, which may comprise in addition various other components, for instance a further processor or memory.

Memory 306 can be accessed by processor 301. It is configured to store data of a global node database. This data could comprise fingerprint data for cellular and non-cellular communication nodes. The fingerprint data could be stored in the form of at least one grid, with each grid point corresponding to real-world coordinates. The grid could be continuously updated based on newly received fingerprints. The stored data may also be used to detect outliers among newly received fingerprints. The stored data could further comprise coverage area model data and radio channel model data that have been generated based on the stored fingerprint data. The model data may be provided for use in position computations. The stored data could further comprise a-priori information on the size of coverage areas. Alternatively, however, such a-priori information could also be part of the computer program code in memory 302, for example part of an application configuration. In addition, memory 306 could store other data. It is to be understood that a memory storing any of the mentioned data could also be external to server 300; it could be for instance on another physical or virtual server.

Interface 304 is a component which enables server 300 to communicate with other devices, like server 400 and terminal 500, via network 600. Interface 304 could comprise for instance a TCP/IP socket.

Component 305 or server 300 could be an exemplary embodiment of a system according to the first aspect of the invention.

Server 400 may be for instance a dedicated analysis server or some other kind of server. It may have a similar structure as server 300, including a processor 401, a memory 402 with program code, an interface 404 and a memory 406.

In this case, memory 406 could comprise a replica of the data of the general node database stored in memory 306.

The program code in memory 402 may comprise code for supporting coverage area modeling. In addition, it may comprise any other kind of program code and any other kind of data.

Server 400 could be an exemplary embodiment of a system according to the second aspect of the invention.

Mobile terminal 500 is configured to scan for communication nodes, including for example WLAN access points and cellular nodes, in its environment. Mobile terminal 500 may also comprise a GNSS receiver, which is configured to compute the position of mobile terminal 500 based on received satellite signals. Mobile terminal 500 is moreover configured to communicate with other devices via a WLAN 420 and/or via a cellular communication network 410.

Cellular communication network 610 could be based on any kind of cellular system, for instance a GSM system, a 3rd Generation Partnership Project (3GPP) based cellular system like a WCDMA system or a time division synchronous CDMA (TD-SCDMA) system, e.g. supporting high speed packet access (HSPA), a 3GPP2 system like a CDMA2000 system, a long term evolution (LTE) or LTE-Advanced system, or any other type of cellular system, like a WiMAX system. Cellular communication network 610 comprises a plurality of base stations or base transceiver stations as communication nodes.

WLAN 620 comprises at least one access point as a communication node.

Exemplary operations in the system of FIG. 6 will now be described with reference to FIG. 7.

Figure 7:
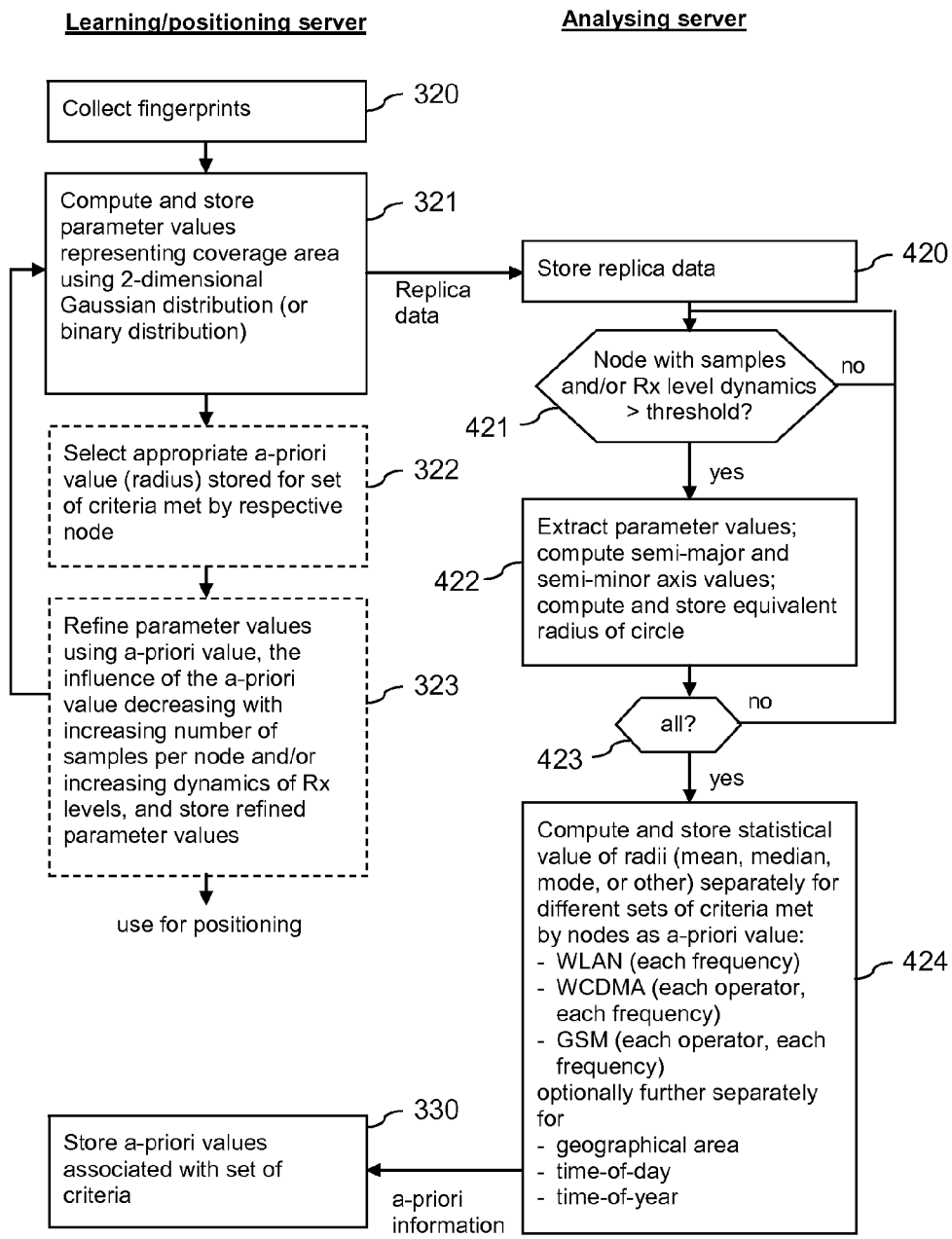
FIG. 7 is a flow chart illustrating an exemplary first operation in the system of FIG. 6.

FIG. 7 is a flow chart illustrating operations at servers 300 and 400. Processor 301 and some of the program code stored in memory 302 cause server 300 to perform the operations presented on the left hand side when the program code is retrieved from memory 302 and executed by processor 301, while processor 401 and some of the program code stored in memory 402 cause server 400 to perform the operations presented on the right hand side when the program code is retrieved from memory 402 and executed by processor 401.

Mobile terminal 500 may be configured to support the collection of learning data for a positioning database. To this end, it may scan the environment at regular intervals for WLAN access points and for base stations of cellular communication networks. At the same time, it may determine its position using the integrated GNSS receiver. Mobile terminal 500 may provide measurement results of the scan along with a GNSS based position as a fingerprint, and transmit the fingerprint in a message to server 300. The measurement results may comprise for each detected communication node an identifier and optionally some other data, like an indication of a received signal strength.

Server 300 may receive the message from mobile terminal 500 and extract the fingerprint. (action 320) Data for each node, for which data is included in the fingerprint, is stored in memory 306 along with an indication of the position from the fingerprint. Corresponding fingerprint data may be collected from a large number of mobile terminals and stored in memory 306. The positions that are indicated for a particular node in memory 306 will also be referred to as position samples for this node.

Based on the stored fingerprint data, server 300 may further compute and store parameter values representing a coverage area for each node, for which position samples are available. (action 321) Parameter values representing the coverage area constitute a coverage area model and could be computed at regular intervals for all nodes. Alternatively, parameter values representing the coverage area could be computed for a respective communication node, whenever a fingerprint including data for this node is received. This may have the effect that the required processing power is distributed over time and has less effect on positioning computations.

Coverage area models can be generated from the position samples in different ways. One option is to consider the coverage area as a binary distribution, meaning that the coverage area is modeled such that all position samples are enclosed by the coverage area.

Another option is to consider the position samples as coming from a two-dimensional Gaussian distribution. The two dimensions are given by the two coordinates indicated by each position sample, namely Latitude and Longitude. In this case the coverage area may be calculated as $$C_{Samples} = \frac{1}{N_{Samples} - 1} \sum_{i=1}^{i=NSample} (\underline{x_i} - \underline{\mu})^T (\underline{x_i} - \underline{\mu}) \qquad (1)$$

where $\underline{x_i}$ comprises the coordinates of a respective position sample, $N_{sample}$ is the number of position samples and $$\underline{\mu} = \frac{1}{N_{Sample}} \sum_{i=1}^{i=NSample} \underline{x_i} \qquad (2)$$

is the position sample mean, i.e. the center point of the coverage area. $C_{samples}$ is a 2×2 covariance matrix describing the distribution of the position samples in the two-dimensional space. If visualized, this matrix describes the 1-sigma ellipse that includes 39% of the samples. The use of such a Gaussian modeling allows using standard means, for example outlier detection using the Chi-Squared tests. In case only a single position sample is available for a node, that is $N_{sample}=1$, the matrix $C_{samples}$ is a zero matrix.

The resulting parameter values, that is, the sample mean and the elements of the covariance matrix, are stored in memory 306 as parameter values representing the coverage area. Alternatively, equivalent values defining the ellipse could be stored. For example, the covariance matrix could be transformed into an equivalent form by converting the elements of the matrix into values for a semi-major axis, a semi-minor axis and an offset angle, that is, the angle of the semi-major axis with respect to, e.g., North.

Server 300 could also generate other models based on the fingerprint data, like radio channel models.

If stored a-priori information is available at server 300, server 300 may moreover refine the coverage area model that has been generated for a respective node.

If stored a-priori information is available, the stored a-priori information may comprise different a-priori values for different sets of criteria. Each a-priori value indicates an assumed radius for nodes that meet all criteria of a particular set of criteria. A set of criteria could comprise for example a particular air interface type, a particular frequency band, a particular operator and/or a particular environment.

Server 300 selects for each node a suitable a-priori value depending on a matching set of criteria. (action 322) The required information on the node may be obtained for instance from a stored identifier of the node or from other measurement results of scans that have been received and stored for the node.

Server 300 may then use for instance the following equation for refining the determined coverage area model for a particular node (action 323):

$$C = (1-f) \cdot C_{samples} + f \cdot C_{prior} \qquad (3)$$

where C is the final coverage area estimate, $C_{samples}$ is the covariance matrix that has been determined based on position samples coordinates in line with above equation (1) for the node, and $C_{prior}$ is a covariance matrix that is based on the radius r that has been selected as a-prior value for a particular node:

$$C_{prior} = \begin{bmatrix} r^2 & 0 \\ 0 & r^2 \end{bmatrix} \qquad (4)$$

The radius r defines a "typical" size of the coverage area of a particular type of node. This can be the mean size, the median size or the mode size, that is, the size with the highest probability. Finally, the function $$f = \exp\left(a \cdot \frac{N_{Sample} - 1}{b}\right), \text{ where } a < 0 \text{ and } b > 0, \quad (5)$$

is a weight function defining the weight that is given to the a-priori information as a function of the number of position samples that were available for computing $C_{samples}$.

Figure 8:
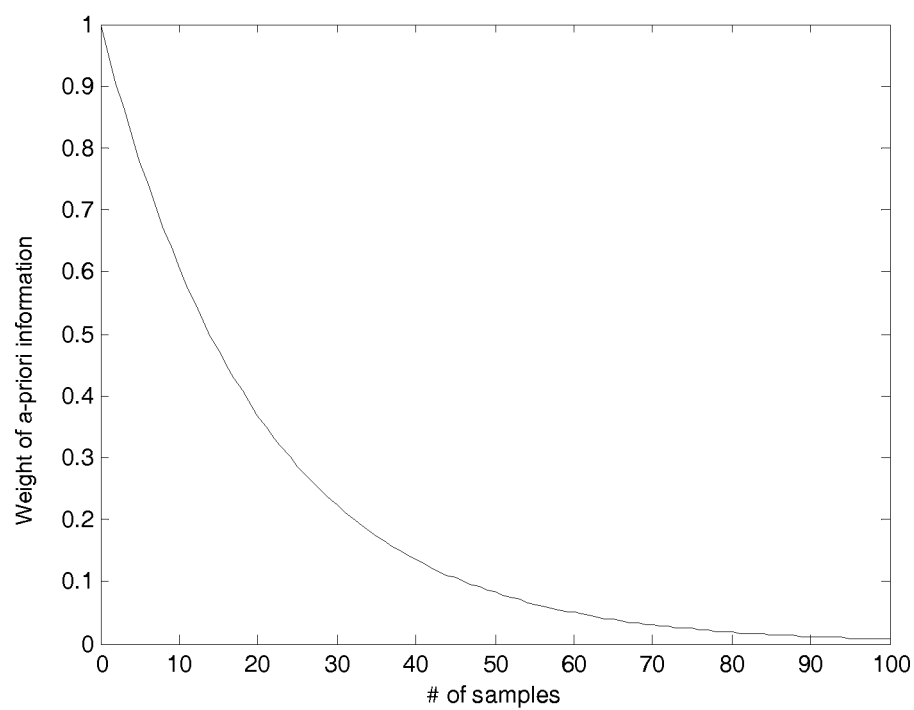
FIG. 8 is a diagram illustrating an exemplary weight function.

FIG. 8 is a diagram illustrating an exemplary weight function $f$ with a=−1.0 and b=20. It can be seen that the more position samples there are for a particular node, the less weight is given to the a-priori information. When there is only a first position sample, the matrix $C_{samples}$ is a zero matrix and the weight function is $f=1$, such that the covariance matrix $C_{prior}$ gets the all the weight, i.e. $C=C_{prior}$. When the number of samples $N_{sample}$ approaches infinity, the covariance matrix $C_{prior}$ gets no weight, i.e. $C=C_{samples}$.

It is to be understood that the weight function presented in equation (5) is just an example. Any other weight function could be used as well. It can be time-based or sample-based with some other than exponential dependency on the sample count, for instance a linear dependency. The weight function could also be based, for instance, on the number of samples including an indication of a position that have been received for the communication node instead of on the number of position samples that have been used for computing the coverage area, or it could be based on the dynamics of received signal strength levels that are stored for the communication node. The weight function could also be a function of a combination of several parameters.

In order to obtain a respective radius r for different sets of criteria as a-priori information for selection, server 300 may periodically provide a replica of the current data of the global node database to server 400. It is to be understood, though, that in an exemplary embodiment, the replicated data may be limited to the coverage area model data. As long as no a-priori information is available, the data may comprise parameter values representing coverage areas without refinement based on a-priory information. Once a-priori information is available, the provided data may comprise parameter values representing coverage areas with or without refinement based on a-priory information. If the parameter values are determined and updated as fingerprints arrive, it may be more efficient if the provided data comprises refined parameter values, since otherwise two sets of parameter values would have to be stored at server 300. Still, it may be preferred to store two sets of parameter values representing coverage areas at server 300, namely one for the original values and one for the refined values, and to always provide parameter values representing coverage areas without refinement to server 400. Using only the original values for computing a-priori values at server 400 may improve their quality. Furthermore, the additional storage consumption for storing a second set of coverage area parameter values at server 300 may be only in the order of a few bytes per node.

Server 400 stores the replica data in memory 406. (action 420)

Server 400 can run through all the nodes in the replica data to obtain information for defining the a-priori information. However, only those nodes are considered for which an adequate number of position samples has been received or for which an adequate number of position samples has been used for computing the coverage area or for which Rx level values with adequate dynamics are available (action 421). If only a few samples have been received for the node, the size of the coverage area indicated by the coverage area model parameters can usually not correspond to the true size of the coverage area of the node—or it corresponds to an old a-priori value. To select the nodes, the number of position samples that are available for the node may be compared to a predetermined threshold value. The number of position samples $N_{sample}$ could be stored in action 321 as an additional value for each node. In order to take account of small coverage areas, which may require less position samples, it may be determined in addition for those nodes, for which the threshold value is not met or for which only a lower threshold value is met, whether stored Rx level values vary by more than a predetermined amount.

For each node with a sufficient number of samples or sufficient Rx level dynamics, server 400 extracts the stored parameter values representing a coverage area and determines the size of the coverage area of the node based on these parameters (action 422).

When assuming that the coverage area of the node is modeled as an ellipse and that the coverage area model parameters comprise elements of a 2×2 covariance matrix representing the ellipse, server 400 may compute a semi-major axis value and a semi-minor axis value of the ellipse from the extracted coverage area model parameters, as well known in the art.

For example, if the 2×2 covariance matrix—with or without refinement—has the structure $$C = \begin{bmatrix} c_{xx}^2 & c_{xy} \\ c_{xy} & c_{yy}^2 \end{bmatrix}, \quad (6)$$

the length of the semi-major axis could be computed as $$semimajor = \frac{c_{xx} + c_{yy} + \sqrt{(c_{yy} - c_{xx})^2 + 4c_{xy}^2}}{2} \quad (7)$$

and the length of the semi-minor axis could be computed as $$semiminor = \frac{c_{xx} + c_{yy} - \sqrt{(c_{yy} - c_{xx})^2 + 4c_{xy}^2}}{2} \quad (8)$$

It is to be understood that if the stored values defining the ellipse already comprise values for semi-minor axis and semi-major axis, these lengths are readily available from the extracted coverage area model parameters.

In order to avoid any influence of the orientation of the ellipse on an a-priori value, server 400 further computes the equivalent radius $r_{eq}$, that is, the radius of a circle that has the same area as an ellipse with a semi-major axis of length semimajor and a semi-minor axis of length semiminor, using the following equation:

$$r_{eq} = \sqrt{semimajor \cdot semiminor}. \quad (9)$$

Alternatively, the equivalent radius $r_{eq}$ could be determined directly from the elements of matrix C. Since the area of an ellipse is $$\text{Area} = \pi \cdot \sqrt{\det(C)}, \quad (10)$$

where det(C) is the determinant of matrix C, equivalent radius $r_{eq}$ can be computed as $$r_{eq} = \sqrt[4]{det(C)}.$$

It is to be understood that if the coverage areas are not modeled as ellipses but as circles, and the stored parameter values representing a coverage area comprise the radius of such a circle, this radius could be extracted from the replica data and used right away for the further processing.

When the equivalent radius has been determined for all communication nodes with sufficient position samples (action 423), server 400 computes statistical values for the radii for different groups of nodes (action 424).

More specifically, server 400 computes the mean, the median, the mode or some other statistical value of all radii that have been determined for nodes meeting a respective set of criteria as a-prior information for the coverage area of any node meeting the same set of criteria. Different statistical values are determined for different sets of criteria. Each set of criteria could comprise only a single criterion or a plurality of criteria.

Figure 9:
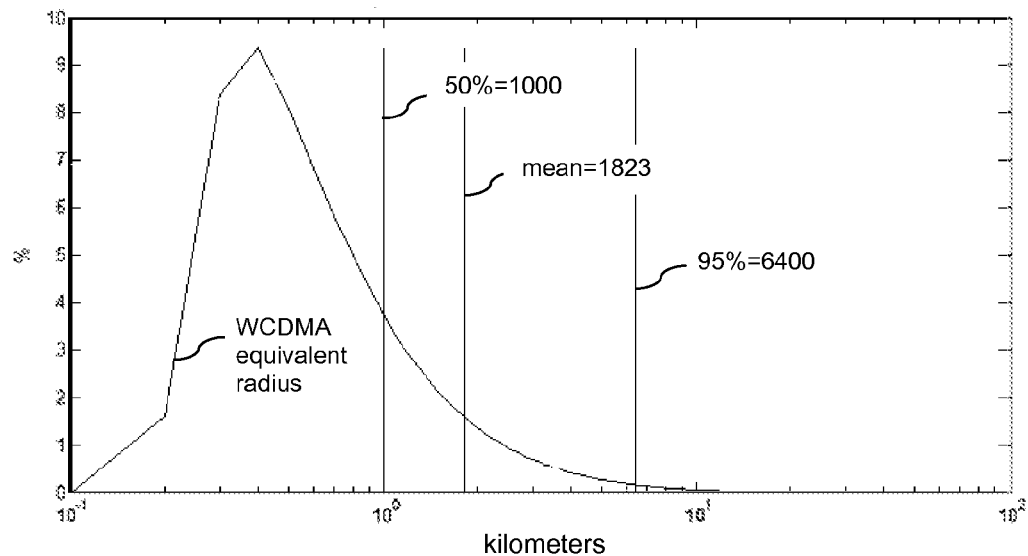
FIG. 9 is a diagram illustrating an exemplary distribution of equivalent radii and different statistical values of the equivalent radii in the case of WCDMA.
Figure 10:
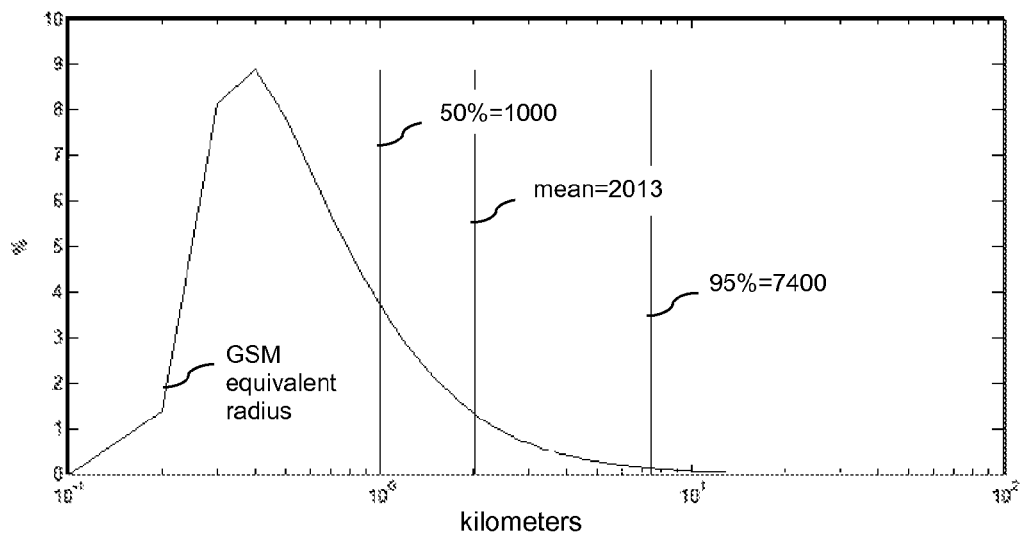
FIG. 10 is a diagram illustrating an exemplary distribution of equivalent radii and different statistical values of the equivalent radii in the case of GSM.

FIGS. 9 and 10 illustrate the difference of statistical values that have been computed from exemplary real data for WCDMA and GSM as exemplary different technologies.

FIG. 9 shows the effective size distribution for UTRA-FDD (WCDMA) cells in percent over the equivalent radius in kilometers, and FIG. 10 shows the effective size distribution for GERAN cells in percent over the equivalent radius in kilometers. In both cases, the mean, the 50% value and the 95% value for the equivalent radii are indicated in addition by horizontal lines. The 50% value means that 50% of the radii are smaller than the indicated value, and the 95% value means that 95% of the radii are smaller than the indicated value.

It can be seen that the mean—or average—radius of the WCDMA cells is roughly 1800 meters, whereas it is roughly 2000 meters for GERAN cells. It can further be seen that the 50% value is roughly 1000 meters in both cases. It can further be seen that the 95% value is roughly 6400 meters for WCDMA cells, whereas it is roughly 7400 meters for GERAN cells.

The coverage area of WLAN access points is much smaller than the cells of any cellular communication network anyhow.

While the technology type may thus already provide some useful differentiation, the use of further criteria, like the used frequency band, allows a further refinement of a-priori information.

For further illustration, the following table summarizes other exemplary real-world measurement data for three radio access technologies (WLAN, GSM and WCDMA) and two cellular communication network operators (A and B) in one particular country, and compares the results across the country to those for one particular city as an exemplary urban area.

| Data type | Semi-major axis | | Semi-minor axis | |
|---|---|---|---|---|
| | Mean (km) | 95% (km) | Mean (km) | 95% (km) |
| WLAN only | 0.1 | 0.2 | 0.0 | 0.1 |
| cellular only[1] | 1.4 | 3.8 | 0.3 | 0.9 |
| GSM only[2] | 2.2 | 5.4 | 0.4 | 1.3 |
| WCDMA only[2] | 1.0 | 3.8 | 0.2 | 0.9 |
| Operator A GSM[3] | 2.3 | 5.7 | 0.3 | 1.2 |
| Operator A WCDMA[3] | 1.1 | 4.8 | 0.3 | 1.0 |
| Operator B GSM[3] | 2.0 | 5.1 | 0.4 | 1.5 |
| Operator B WCDMA[3] | 0.8 | 2.5 | 0.2 | 0.7 |
| Operator A GSM[4] | 0.8 | 1.8 | 0.2 | 0.7 |
| Operator A WCDMA[4] | 0.7 | 1.8 | 0.4 | 0.3 |
| Operator B GSM[4] | 0.7 | 1.7 | 0.3 | 0.8 |
| Operator B WCDMA[4] | 0.8 | 2.0 | 0.4 | 0.8 |

[1]GSM and WCDMA, all operators, whole country
[2]All operators, whole country
[3]Whole country
[4]Urban area (one city) - a subset of ([3])

The table clearly shows the differences between WLAN and cellular technologies. The coverage area of WLAN access points are much smaller than cells. Moreover, the table clearly shows the differences in the characteristics of GSM and WCDMA networks. Moreover, the table clearly shows the differences between the operators. Operator A has somewhat bigger GSM and WCDMA cells than operator B. Moreover, the table clearly shows the differences between the whole country and one specific urban area. This shows that cells in the urban area are typically significantly smaller than elsewhere.

The table does not show results for different frequencies, but it is well known in the art that also the frequency significantly affects the size of a coverage area of a node.

Other criteria could be considered in addition, like the time-of-day or the time-of-year.

Server 400 stores the computed statistical value of radii as an a-priori value for each considered set of criteria and provides the a-priori value along with an indication of the associated set of criteria as a-priori information to server 300.

Server 300 stores the received a-priori values along with an indication of the respectively associated set of criteria. (action 330) The a-priori values are then available for selection in action 322.

It is to be understood that the a-priori information used by server 300 does not have to be computed based on the data collected and/or used by server 300 for positioning computations. It could also be a-priori information that has been determined based on data from another server or based on data from a plurality of servers. It is further to be understood that the a-priori information does not necessarily have to be updated. It could also be provided only once when starting the creating of a database in server 300. Using the data generated at server 300 for computing the a-priori information and updating the a-priori information periodically may have the effect, though, that the a-priori information is matched exactly to the communication nodes for which data is collected at server 300. As long as it is not yet possible to determine any a-priori information using the data generated at server 300 due to a lack of a sufficient number of position samples, default a-priori information could be used.

It is further to be understood that the distribution of functions to servers 300 and 400 presented with reference to FIGS. 4 to 7 is arbitrary and only exemplary. Any other distribution could be used as well, and additional servers or entities could be involved. For example, in one variation, server 300 could perform the entire operation presented with reference to FIG. 7. In another variation, the fingerprint data could be collected and stored at another server and provided by this other server to server 300. In yet another variation, separate learning and positioning servers could be provided, the learning server performing actions 320-330 and the positioning server taking care of any positioning requests of mobile devices using the data that is generated and stored by the learning server.

Summarized, certain embodiments of the invention may have the effect of resulting in a better user experience with a positioning service. Whenever data for a new or moved communication node is collected, a reasonable first estimate for the coverage area model can be obtained, even if only a few fingerprints are available for this node. Producing too large or too small coverage area estimates can thus be avoided.

In some situations, this may be of particular interest. The radio landscape is known to be highly dynamic. For example, an entire existing cellular communication network (for one access type and operator) may be re-planned, meaning that the base stations change their identity. In such a case, the database build-up for the network in question must be commenced from scratch. With certain embodiments of the invention, it is possible to assign high-quality coverage areas to the base stations as soon as the system starts to get a few samples from the new locations of the base stations.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory (ROM), a random access memory (RAM), a flash memory or a hard disc drive memory etc.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

Figure 11:
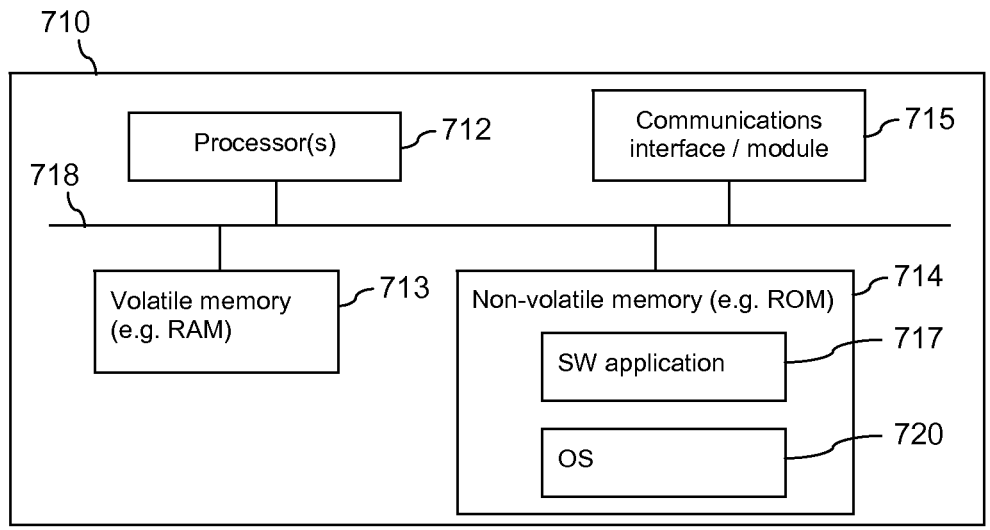
FIG. 11 is a schematic block diagram of an exemplary embodiment of an apparatus.
Figure 12:
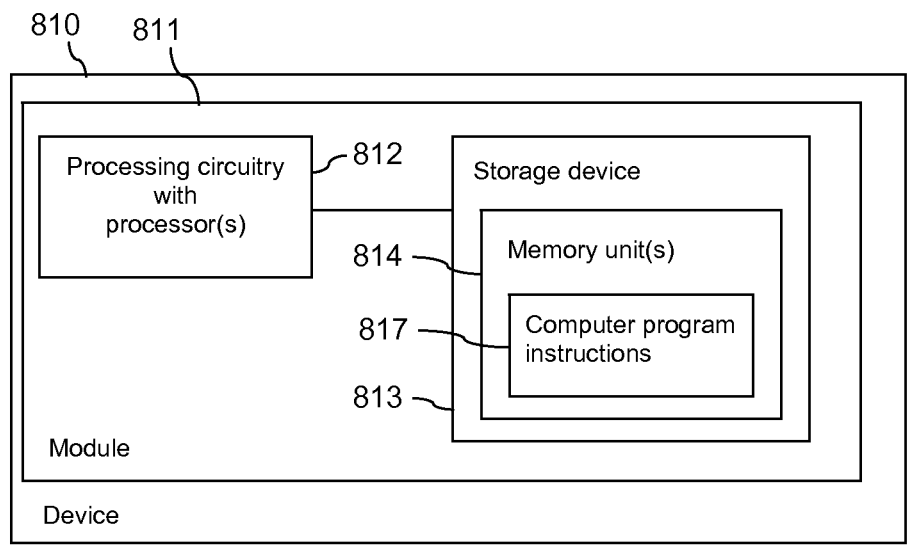
FIG. 12 is a schematic block diagram of an exemplary embodiment of an apparatus and FIG. 13 schematically illustrates exemplary removable storage devices.

Exemplary embodiments using at least one processor and at least one memory as a non-transitory data medium are shown in FIGS. 11 and 12.

FIG. 11 is a schematic block diagram of a device 710. Device 710 includes a processor 712. Processor 712 is connected to a volatile memory 713, such as a RAM, by a bus 718. Bus 718 also connects processor 712 and RAM 713 to a non-volatile memory 714, such as a ROM. A communications interface or module 715 is coupled to bus 718, and thus also to processor 712 and memories 713, 714. Within ROM 714 is stored a software (SW) application 717. Software application 717 may be a navigation application, although it may take some other form as well. An operating system (OS) 720 also is stored in ROM 714.

FIG. 12 is a schematic block diagram of a device 810. Device 810 may take any suitable form. Generally speaking, device 810 may comprise processing circuitry 812, including one or more processors, and a storage device 813 comprising a single memory unit or a plurality of memory units 814. Storage device 813 may store computer program instructions that, when loaded into processing circuitry 812, control the operation of device 810. Generally speaking, also a module 811 of device 810 may comprise processing circuitry 812, including one or more processors, and storage device 813 comprising a single memory unit or a plurality of memory units 814. Storage device 813 may store computer program instructions that, when loaded into processing circuitry 812, control the operation of module 811.

The software application 717 of FIG. 11 and the computer program instructions 817 of FIG. 12, respectively, may correspond e.g. to the computer program code in any of memories 102, 202, 302 or 402.

Figure 13:
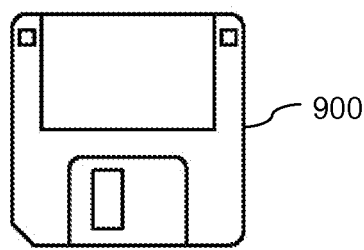
Figure 13:
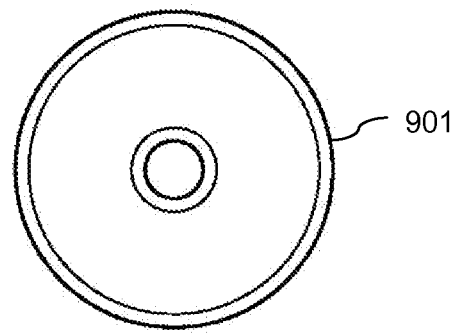
Figure 13:
Figure 13:
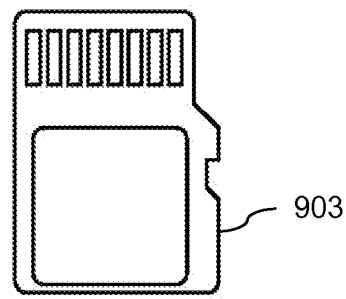

In exemplary embodiments, any non-transitory computer readable medium mentioned in this text could also be a removable/portable storage or a part of a removable/portable storage instead of an integrated storage. Exemplary embodiments of such a removable storage are illustrated in FIG. 13, which presents, from top to bottom, schematic diagrams of a magnetic disc storage 900, of an optical disc storage 901, of a semiconductor memory circuit device storage 902 and of a Micro-SD semiconductor memory card storage 903.

The functions illustrated by processor 101 in combination with memory 102, or processor 301 in combination with memory 302, or the integrated circuit 305 can also be viewed as means for obtaining information on at least one position stored for a communication node and at least one criterion that is met by the communication node; means for selecting a-priori information on a coverage area size that is stored for communication nodes meeting the at least one criterion, wherein different a-priori information is stored for communication nodes meeting different criteria; means for estimating a value of at least one parameter representing a coverage area of the communication node based on the obtained information on the at least one position and the selected a-priori information; and means for causing a storage of the value of the at least one parameter representing the coverage area of the communication node.

The program codes in memories 102 and 302 can also be viewed as comprising such means in the form of functional modules.

The functions illustrated by processor 201 in combination with memory 202 or by processor 401 in combination with memory 402 can also be viewed as means for extracting from a memory information indicating a size of a coverage area for each of a plurality of communication nodes; means for computing a statistical value based on information indicating a size of a coverage area that is extracted for a plurality of communication nodes meeting a same at least one criterion; and means for providing the computed statistical value as a-priori information for an estimation of a value of at least one parameter representing a coverage area of a communication node meeting the at least one criterion.

The program codes in memories 202 and 402 can also be viewed as comprising such means in the form of functional modules.

FIGS. 2, 4 and 7 may also be understood to represent exemplary functional blocks of computer program codes supporting a coverage area modeling.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an exemplary embodiment in a particular category may also be used in a corresponding manner in an exemplary embodiment of any other category.

What is claimed is:

1. A method comprising:
obtaining information on one or more positions stored for a communication node and at least one criterion that is met by the communication node;
selecting a-priori information on a coverage area size that is stored for communication nodes meeting the at least one criterion, wherein different a-priori information is stored for communication nodes meeting different criteria;
estimating a value of at least one parameter representing a coverage area of the communication node based on the obtained information on the one or more positions and the selected a-priori information, wherein a weight assigned to the selected a-priori information in estimating the value of the at least one parameter is inversely proportional to a number of one or more positions obtained; and
causing a storage of the value of the at least one parameter representing the coverage area of the communication node.

2. The method according to claim 1, wherein the at least one criterion relates to at least one of
a type of air interface supported by the communication node;
a frequency range supported by the communication node;
a network operator operating the communication node;
a geographical area in which the communication node is located;
a time-of-day at which the communication node is currently operating; and
a time-of-year at which the communication node is currently operating.

3. The method according to claim 1, wherein estimating the value of the at least one parameter representing a coverage area of the communication node based on the obtained information on the at least one position and the selected a-priori information comprises estimating a value of the at least one parameter based on the information on the at least one position and adjusting the value of the at least one parameter using the a-priori information.

4. The method according to claim 1, wherein the influence of the a-priori information in estimating the value of the at least one parameter representing a coverage area of the communication node based on the obtained information on the at least one position and the selected a-priori information is at least one of:
the lower, the higher the number of the at least one position on which information is obtained;
the lower, the higher a number of samples including an indication of a position that have been received for the communication node; and
the lower, the higher dynamics of received signal strength levels that are indicated in stored information for the communication node.

5. The method according to claim 1, comprising preceding actions of:
extracting from a memory information indicating a size of a coverage area for each of a plurality of communication nodes; and
computing as a respective a-priori information a statistical value based on the information extracted for a plurality of communication nodes meeting a same at least one criterion.

6. The method according to claim 5, wherein information indicating a size of a coverage area that is stored in the memory for a respective communication node is only considered for computing a-priori information if at least one of:
the information indicating a size of a coverage area is based on a predetermined number of positions for the communication node;
more than a predetermined number of samples including an indication of a position have been received for the communication node; and
stored information for the communication node comprises indications of received signal strength levels with predetermined dynamics.

7. The method according to claim 5, wherein the extracted information indicating a size of a coverage area for a respective communication node defines an ellipse and wherein computing a respective statistical value comprises:
computing for each of the plurality of communication nodes meeting the same at least one criterion a radius of a circular model based on the extracted information defining an ellipse; and
statistically combining the radii that have been determined for the plurality of communication nodes meeting the same at least one criterion.

8. A system comprising at least one processor and at least one memory including computer program code, the at least one memory and the computer program code configured to, with the at least one processor, cause at least one apparatus at least to perform:
obtain information on one or more positions stored for a communication node and at least one criterion that is met by the communication node;

select a-priori information on a coverage area size that is stored for communication nodes meeting the at least one criterion, wherein different a-priori information is stored for communication nodes meeting different criteria;

estimate a value of at least one parameter representing a coverage area of the communication node based on the obtained information on the one or more positions and the selected a-priori information, wherein a weight assigned to the selected a-priori information in estimating the value of the at least one parameter is inversely proportional to a number of one or more positions obtained; and cause a storage of the value of the at least one parameter representing the coverage area of the communication node.

9. The system according to claim 8, wherein the at least one criterion relates to at least one of
a type of air interface supported by the communication node;
a frequency range supported by the communication node;
a network operator operating the communication node;
a geographical area in which the communication node is located;
a time-of-day at which the communication node is currently operating; and
a time-of-year at which the communication node is currently operating.

10. The system according to claim 8, wherein estimating the value of the at least one parameter representing a coverage area of the communication node based on the obtained information on the at least one position and the selected a-priori information comprises estimating a value of the at least one parameter based on the information on the at least one position and adjusting the value of the at least one parameter using the a-priori information.

11. The system according to claim 8, wherein the influence of the a-priori information in estimating the value of the at least one parameter representing a coverage area of the communication node based on the obtained information on the at least one position and the selected a-priori information is one of:
the lower, the higher the number of the at least one position on which information is obtained;
the lower, the higher a number of samples including an indication of a position that have been received for the communication node; and
the lower, the higher dynamics of received signal strength levels that are indicated in stored information for the communication node.

12. The system according to claim 8, wherein the computer program code is configured to, with the at least one processor, cause the at least one apparatus to perform:
extract from a memory information indicating a size of a coverage area for each of a plurality of communication nodes; and
compute as a respective a-priori information a statistical value based on the information extracted for a plurality of communication nodes meeting a same at least one criterion.

13. The system according to claim 12, wherein the computer program code is configured to, with the at least one processor, cause the at least one apparatus to only consider information indicating a size of a coverage area that is stored in the memory for a respective communication node for computing a-priori information if at least one of:
the information indicating a size of a coverage area is based on a predetermined number of positions for the communication node;
more than a predetermined number of samples including an indication of a position have been received for the communication node; and
stored information for the communication node comprises indications of received signal strength levels with predetermined dynamics.

14. The system according to claim 12, wherein the extracted information indicating a size of a coverage area for a respective communication node defines an ellipse and wherein the computer program code is configured to, with the at least one processor, cause the at least one apparatus to compute a respective statistical value by:
computing for each of the plurality of communication nodes meeting the same at least one criterion a radius of a circular model based on the extracted information defining an ellipse; and
statistically combining the radii that have been determined for the plurality of communication nodes meeting the same at least one criterion.

15. The system according to claim 8, wherein the system one of:
is an apparatus;
is a server;
is a component for a server;
comprises a plurality of apparatuses; and
comprises a plurality of servers.

16. A computer program code stored on a non-transitory computer-readable medium, the computer program code when executed by a processor causing at least one apparatus to perform the actions of the method of claim 1.

17. A non-transitory computer readable storage medium in which computer program code is stored, the computer program code when executed by a processor causing at least one apparatus to perform the following:
obtain information on one or more positions stored for a communication node and at least one criterion that is met by the communication node;
select a-priori information on a coverage area size that is stored for communication nodes meeting the at least one criterion, wherein different a-priori information is stored for communication nodes meeting different criteria;
estimate a value of at least one parameter representing a coverage area of the communication node based on the obtained information on the one or more positions and the selected a-priori information, wherein a weight assigned to the selected a-priori information in estimating the value of the at least one parameter is inversely proportional to a number of one or more positions obtained; and
cause a storage of the value of the at least one parameter representing the coverage area of the communication node.

* * * * *

UNITED STATES PATENT AND TRADEMARK OFFICE
CERTIFICATE OF CORRECTION

PATENT NO. : 9,612,313 B2
APPLICATION NO. : 14/185652
DATED : April 4, 2017
INVENTOR(S) : Wirola et al.

Page 1 of 1

It is certified that error appears in the above-identified patent and that said Letters Patent is hereby corrected as shown below:

On the Title Page

Please insert the following:
--(30) Foreign Application Priority Data
Feb. 25, 2013   (WO)   PCT/IB2013/051513--

Signed and Sealed this
Twenty-second Day of January, 2019

Andrei Iancu
*Director of the United States Patent and Trademark Office*